March 18, 1924.

J. A. MANION.

FILM SCOPE TOY

Filed Jan. 27, 1920

1,487,173

Inventor:
Joseph A. Manion,
By Fredk. J. Hanson,
Attorney.

Patented Mar. 18, 1924.                                                           1,487,173

UNITED STATES PATENT OFFICE.

JOSEPH A. MANION, OF ST. LOUIS, MISSOURI, ASSIGNOR TO ZDENKO A. SHUBERT, OF NEW ORLEANS, LOUISIANA.

FILM-SCOPE TOY.

Application filed January 27, 1920. Serial No. 354,515.

*To all whom it may concern:*

Be it known that I, JOSEPH A. MANION, a citizen of the United States, residing in the city of St. Louis and State of Missouri, have invented a certain new and novel Film-Scope Toy, of which the following is a specification.

My invention relates to a film scope toy and has for its object to provide a simple little device having a lens and a sight opening to be used in connection with sections of waste motion picture films having views produced thereon.

A further object of the invention is to provide novel means for holding a section of motion picture film over the sight opening of the film scope so the picture thereon may be viewed through the lens.

Another object of the invention is to provide a film scope toy for enlarging the pictures on waste sections of motion picture films which will be simple and inexpensive in construction and highly efficient for the purpose intended as a toy.

It is evident that motion picture films can be purchased from motion picture houses for practically nothing after the films have become worn and it is my object to purchase these "so-called" worn out films and cut them up into small sections to be observed through the lens of the film scope.

With the above and other objects in view, the invention for utilizing waste motion picture films consists in the novel construction, arrangement and combination of parts hereinafter fully described and finally pointed out in the claim hereto appended.

Referring to the accompanying drawings forming a part of this specification wherein like characters of reference denote similar parts throughout the several views.

Figure 2:
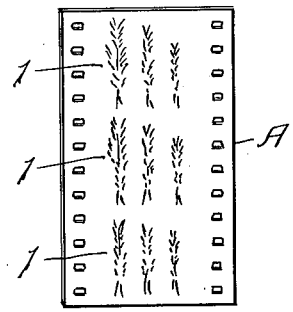
Fig. 2, is a perspective view of a section of waste motion picture film.

Referring to the drawings A indicates a section of a motion picture film. The section illustrated in Fig. 2 shows three view or picture sections 1.

Figure 3:
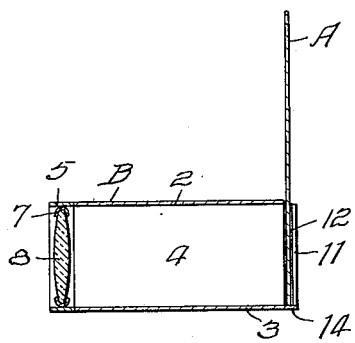
Fig. 3, is a vertical sectional view of the film scope toy and a section of motion picture film positioned at the sight opening end thereof.

The reference character B indicates a film scope hollow body or housing consisting of the top wall 2, bottom wall 3 and the two side walls 4. The side walls 4, of the body B converge toward the lens end of the body B. A ring like member 5 is suitably fixed to the small or lens end of the body B and the end 6 of the body B is closed around the ring 5. A lens holder 7 is fixed within the ring 5 and a suitable lens 8 is mounted in the holder 7 to close the lens end of the film scope body B. The top and bottom walls of the body B lie parallel with one another, as shown in Fig. 3.

Figure 1:
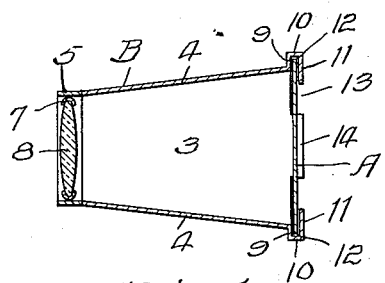
Fig. 1, is a horizontal sectional view of the film scope toy, showing a motion picture film positioned at the sight opening end thereof.
Figure 4:
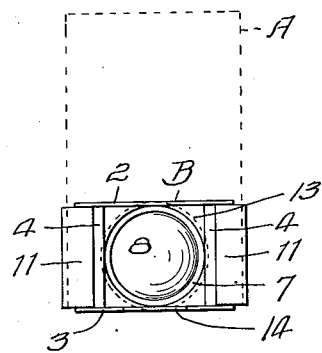
Fig. 4, is an end elevation of the film scope toy looking at the sight opening end thereof, the film being indicated by dotted lines.
Figure 5:
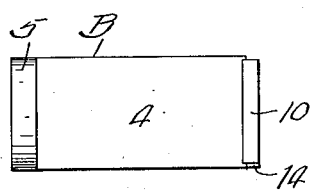
Fig. 5, is a side elevation of the film scope toy.
Figure 6:
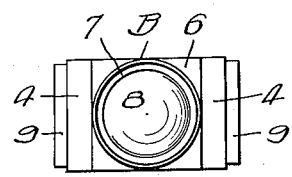
Fig. 6, is an end elevation of the film scope toy looking at the lens ends thereof.

The end of each side wall 4 opposite the lens end of the body is bent outwardly as at 9, forwardly as at 10 and then inwardly to form wings as at 11 to provide a vertical way 12 on opposite sides of the film scope body B at the sight opening or enlarged end thereof. The sight opening 13 is formed between the ends of the top and bottom walls 2 and 3 and the ends of the inwardly extending wings 11, as shown in Fig. 4. A suitable lip 14 extends forwardly from the enlarged end of the bottom wall 3 to act as a rest plate or stop for the film A when inserted into the ways 12, as clearly shown in Figs. 1 and 3.

The photographic view upon the picture section 1 is of a size to just cover the sight opening 13, as is manifest. While I have shown a section of motion picture film in Fig. 2 as consisting of three photographic views, the film section to be inserted into the ways 12, at the sight opening end of the film scope body B, may be of a size to bear but one view, if desired. One object of cutting the film section A longer than the height of the sight opening 13 is to cause the film to extend upwardly a suitable distance above the top wall of the film scope body to facilitate removal of the film section from the way 12 after the picture on the film has been viewed through the lens 8.

Owing to the transparency of the motion picture film sections 1 the full photographic view shown on the film will be enlarged and brought out wonderfully clear when holding the film scope up toward the light and viewing the picture through the lens 8.

It is evident from the foregoing description that a toy, so constructed as to utilize the worn out or worthless motion picture films when cut into short sections will provide a novel and entertaining amusement device, or toy for children when provided with a supply of film sections bearing various photographic views.

The many advantages of a toy of the class described will readily suggest themselves to those skilled in the art to which it appertains.

I do not wish to be understood as having limited myself to the exact details of construction shown and described, but desire to have it understood that the invention I have shown in the drawings is merely illustrative, as it is manifest that various minor changes may be made in the form, shape and particular arrangement of parts without departing from the spirit of my invention, hence reserve the right to make any such changes or modifications as may fairly fall within the scope of the appended claim when fairly construed.

What I claim is:

A film scope toy comprising a hollow body having a top plate, a bottom plate and two converging side walls to form a single unobstructed sight opening at the large end of the hollow body, a single lens positioned in the small end of the hollow body, a pair of opposed vertically disposed ways formed by lipped terminations of said converging side walls at the unobstructed sight opening end thereof for receiving the side edges of a section of motion picture film placed in front of the sight opening and a narrow centrally disposed film stop integral with the bottom plate and directed forwardly from the sight opening edge thereof.

In testimony whereof, I have hereunto signed my name to the specification.

JOSEPH A. MANION.